(12) United States Patent
Brant

(10) Patent No.: US 6,659,565 B2
(45) Date of Patent: Dec. 9, 2003

(54) MOTORIZED HAND TRUCK FOR DRIVING AND STEERING A WHEELED ACCESSORY

(75) Inventor: Ronald G. Brant, Smyma, TN (US)

(73) Assignee: Murray, Inc., Brentwood, TN (US)

( * ) Notice: Subject to any disclaimer, the term of this patent is extended or adjusted under 35 U.S.C. 154(b) by 19 days.

(21) Appl. No.: 10/122,765

(22) Filed: Apr. 15, 2002

(65) Prior Publication Data

US 2003/0193233 A1 Oct. 16, 2003

(51) Int. Cl.$^7$ .................................................. B60P 1/04
(52) U.S. Cl. .......................... 298/1 C; 298/1 A; 298/2; 298/7
(58) Field of Search .............................. 298/1 A, 1 C, 298/2, 7, 17 R, 17 T; 280/47.18, 47.23, 47.31, 653; 180/19.1, 19.2, 19.3

(56) References Cited

U.S. PATENT DOCUMENTS

| | | | | |
|---|---|---|---|---|
| 2,981,428 A | * | 4/1961 | Noffringer | |
| 3,323,837 A | * | 6/1967 | Landry | 298/2 |
| 4,811,988 A | * | 3/1989 | Immel | 298/2 |
| RE33,131 E | * | 12/1989 | Morrison | 298/1 H |
| 5,360,259 A | * | 11/1994 | Lemberger | 298/19 V |
| 5,439,069 A | * | 8/1995 | Beeler | |
| 6,238,004 B1 | * | 5/2001 | Hansen et al. | 298/17 T |
| 6,409,273 B1 | * | 6/2002 | Campbell | 298/2 |
| 6,536,845 B2 | * | 3/2003 | Jansen et al. | 298/1 C |

* cited by examiner

Primary Examiner—Stephen T. Gordon
(74) Attorney, Agent, or Firm—Kevin E. Joyce

(57) ABSTRACT

A hand truck is provided with at least one wheel which is driven and is steerable. A wheeled accessory is removably connected to the hand truck to be powered and directed in response to operation of the hand truck.

18 Claims, 5 Drawing Sheets

MOTORIZED HAND TRUCK FOR DRIVING AND STEERING A WHEELED ACCESSORY

BACKGROUND OF THE INVENTION

1. Field of the Invention

The present invention relates to a motorized hand truck which may be interchangeably connected with various accessories for lawn and garden applications.

2. Prior Art

The utility of a motorized unit for moving a lawn or garden implement is known. For example, a presently marketed unit, known as the DP Powerwagon, comprises a frame having a pair of driven wheels at one end and a single steerable wheel at the other. The latter is joined to an operator-controlled handle which permits the unit to be steered. The frame supports a gasoline engine which is joined to the drive wheels to propel the unit in either a forward or reverse direction. The frame also supports a carrier whereby the unit can transport material loaded in the carrier. In some versions of the DP Powerwagon the carrier is a tray which is pivotally joined to the frame so that the tray can be tipped to dump its contents.

SUMMARY OF THE INVENTION

The present invention differs from the prior art in that a motorized hand truck is provided which can power any of a number of separate accessories selectively joined to the hand truck. More particularly, a frame member is provided to support single or double wheels driven by a motor, also secured to the frame. The frame includes a connector arrangement which permits a lawn or garden accessory to be detachably joined to the hand truck through a pivotal connection. An operator handle also is connected to the frame to permit the frame to be pivoted relative to the accessory joined to the hand truck. The accessory thus can be powered and steered independently of the accessory itself

BRIEF DESCRIPTION OF THE DRAWINGS

The invention now will be described in greater detail with respect to the accompanying drawings, wherein.

DETAILED DESCRIPTION OF THE PREFERRED EMBODIMENTS OF THE INVENTION

Figure 1:
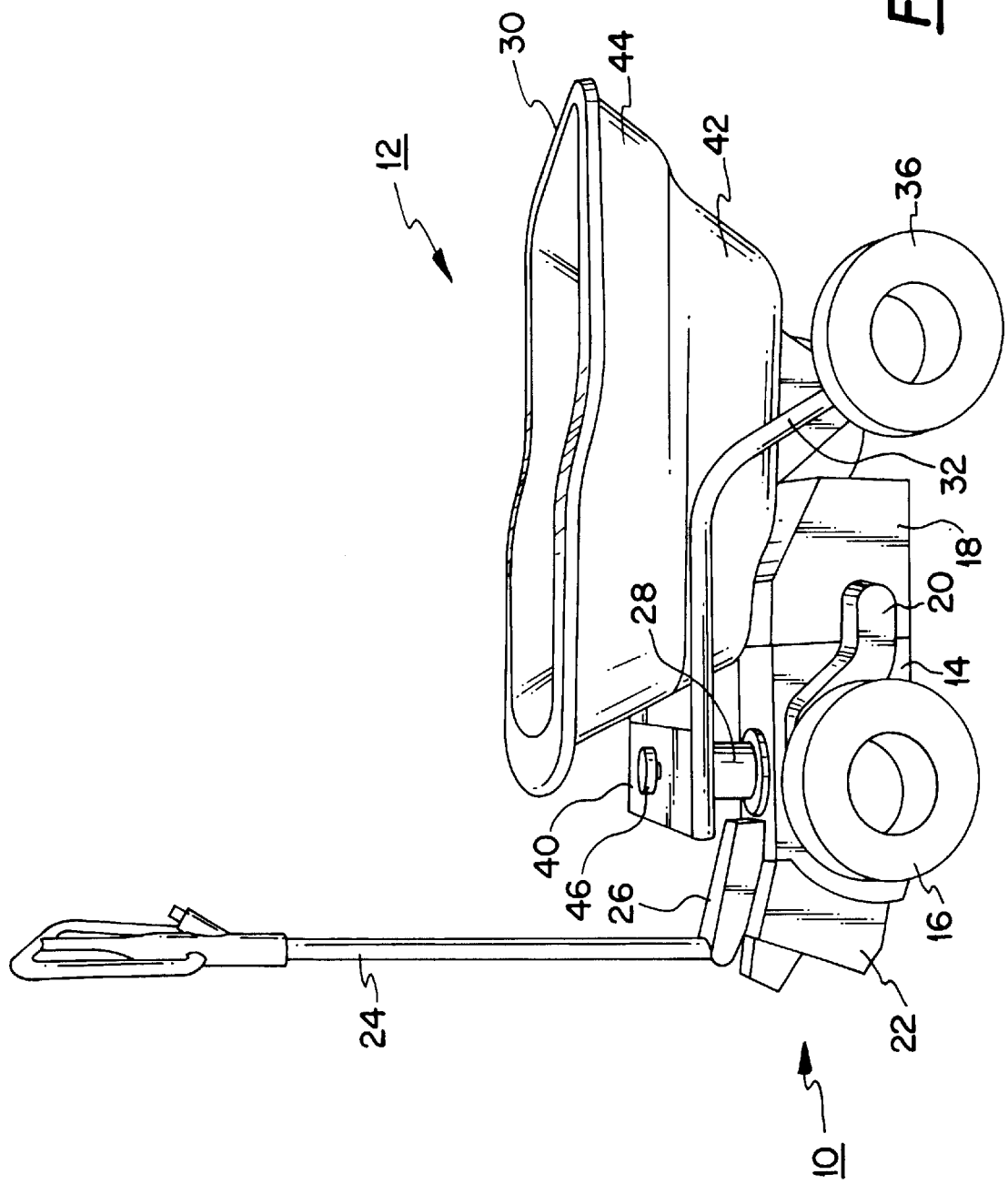
FIG. 1 illustrates a first embodiment of the invention wherein the hand truck is one having a pair of drive wheels and the accessory is a wheelbarrow.
Figure 2:
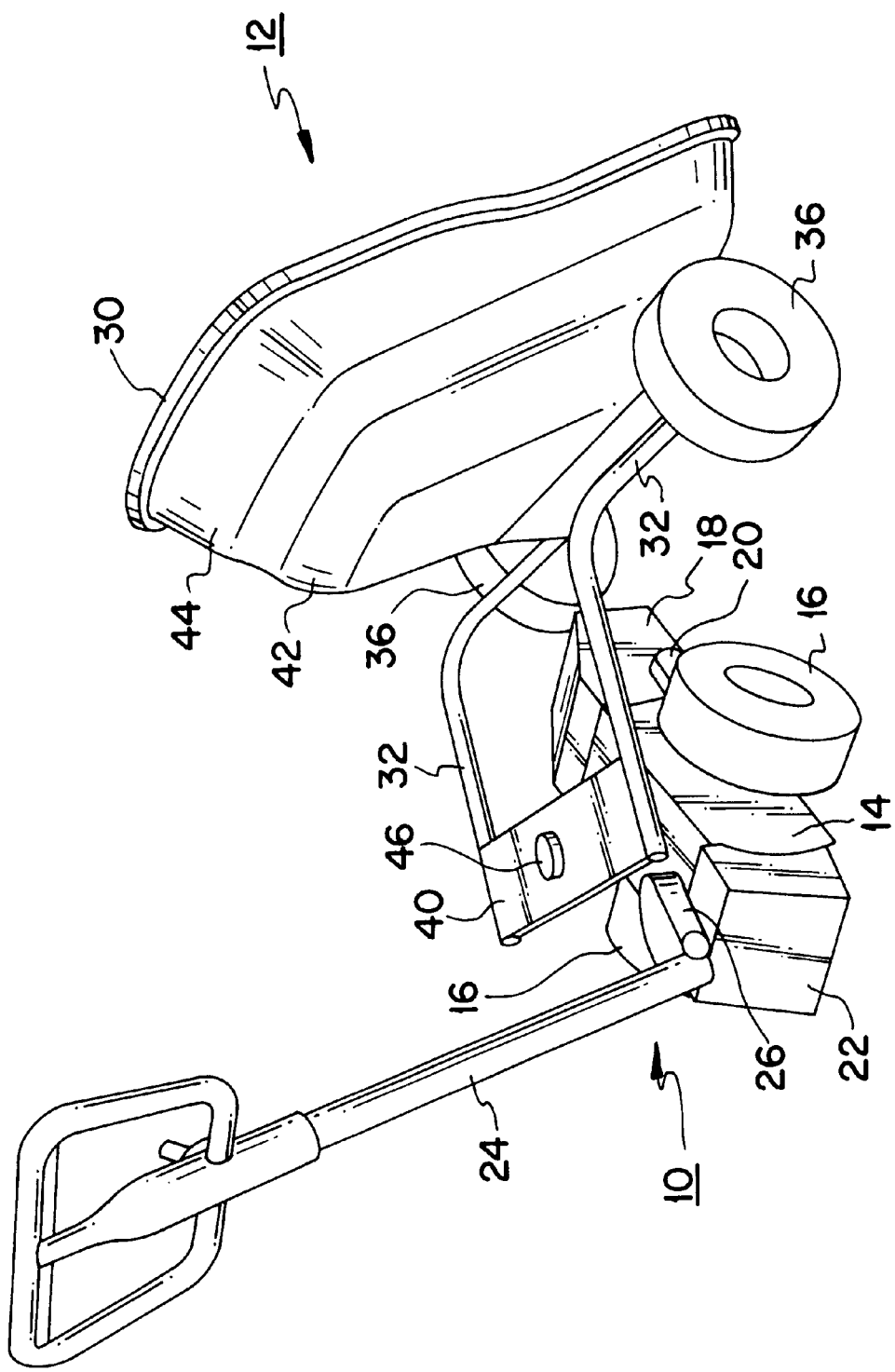
FIG. 2 illustrates the embodiment of FIG. 1 with the tray associated with the wheelbarrow accessory being shown in the dumping position.

Referring to the drawings, FIGS. 1 and 2 illustrate a motorized hand truck 10 and an accessory 12 coupled to the hand truck. The hand truck 10 comprises an inverted generally U-shaped frame 14 which supports a pair of drive wheels 16 disposed on opposite sides of the frame. An electric motor is disposed at the front end of frame 14, the motor being covered by a housing 18 secured to frame 14. A conventional drive connection extends between the motor and the drive wheels 16, the drive connection being located within a cover 20 joined to one side of frame 14. A battery housing 22 is secured to the rear of frame 14. A chargeable battery housed within housing 22 is connected to the motor within housing 18 to power the motor. A handle 24 is pivotally joined to a yoke 26 fixed to the upper surface of frame 14. Conventional controls are provided in the gripping area of handle 24 for operating switches which establish connections between the battery and the motor to selectively move the drive wheels 16 in a forward or reverse direction.

Figure 3:
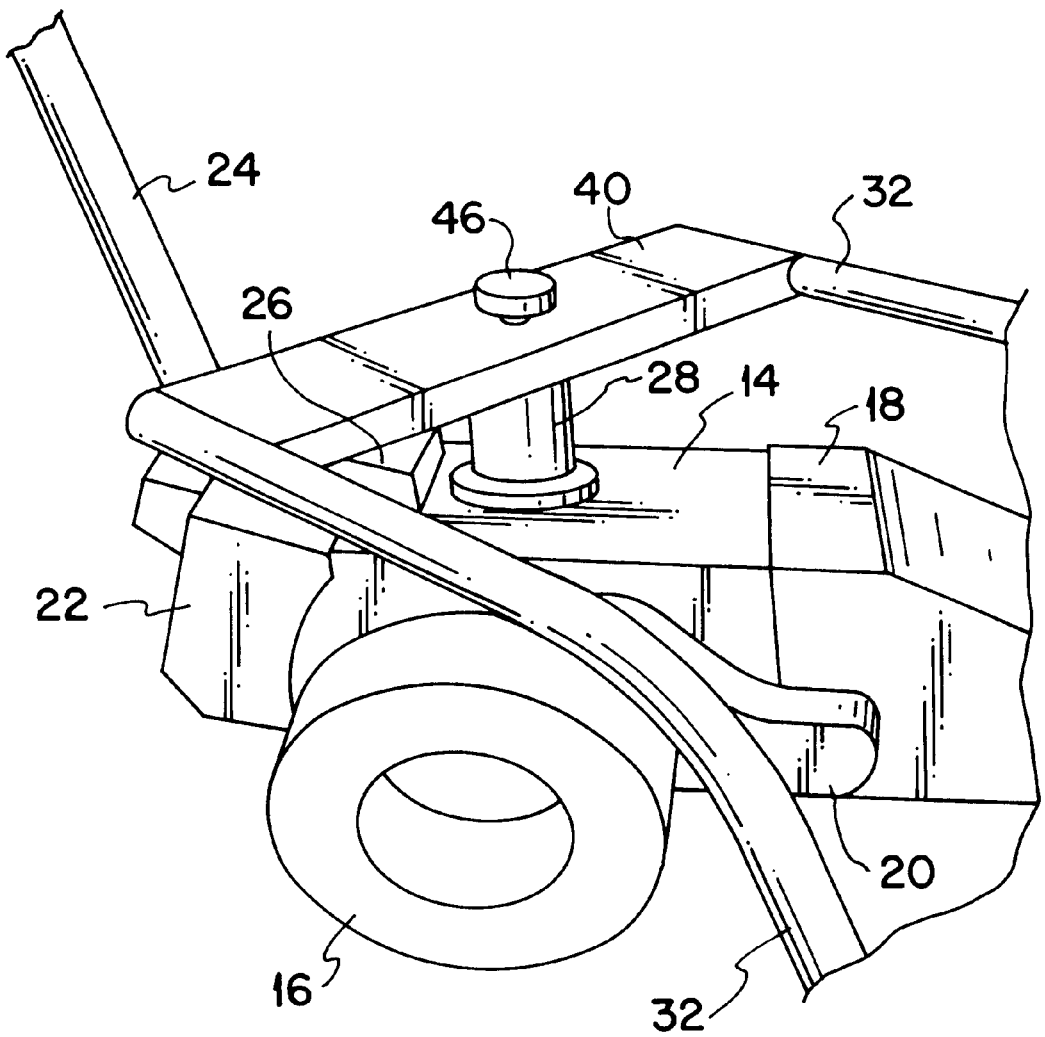
FIG. 3 is an enlarged fragmented view of the embodiment of FIG. 1 illustrating details of the connection between the hand truck and the accessory.

A post 28 is secured to the top surface of frame 14 (FIG. 3). The upper end of post 28 is provided with a suitable connector for pivotally interconnecting the hand truck 10 to accessory 12.

Figure 4:
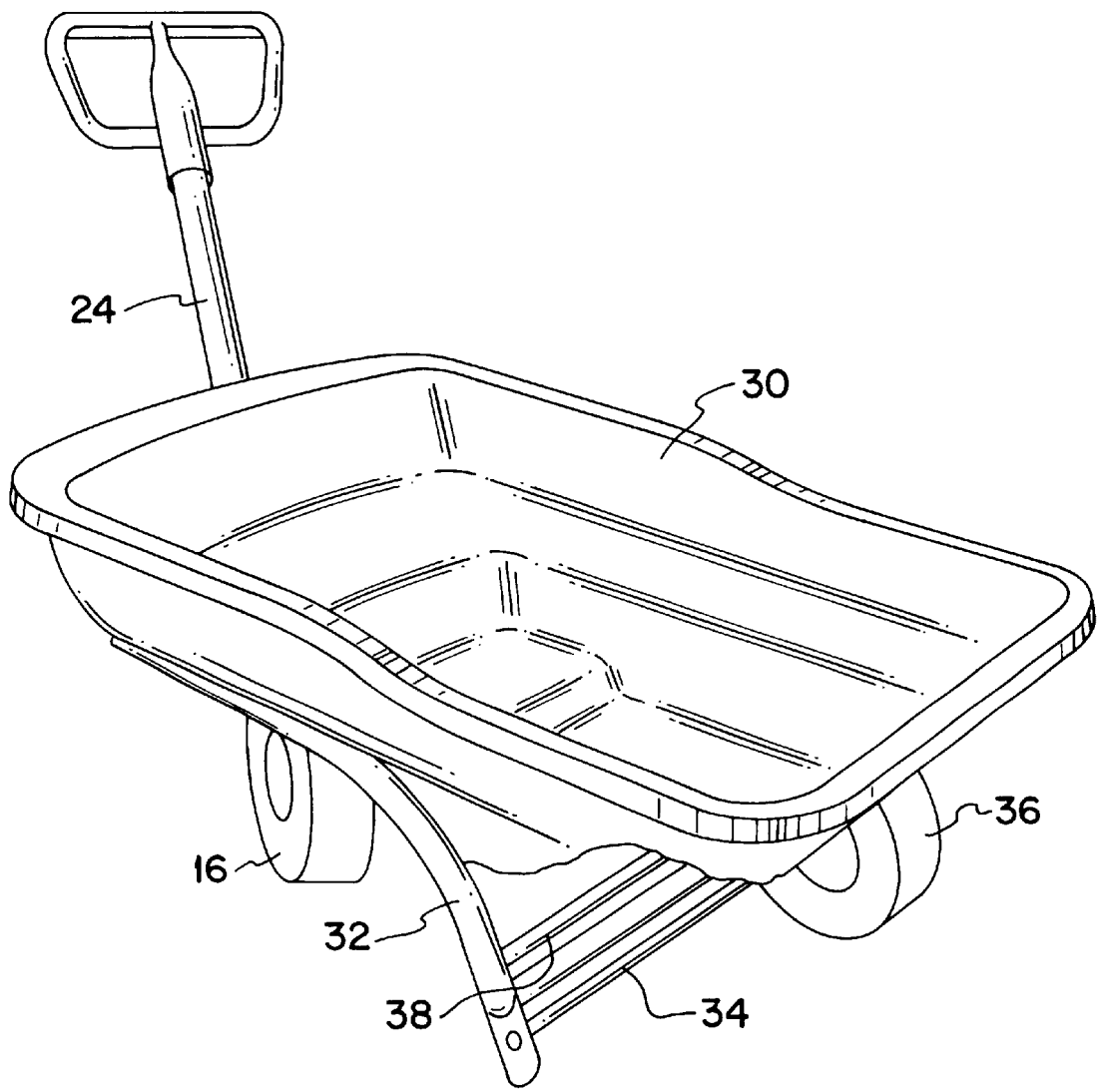
FIG. 4 is a fragmented view of the embodiment of FIG. 1 illustrating how the tray of the accessory is joined to the frame.

The accessory 12 which is illustrated is a wheelbarrow. It will be understood, however, that various other types of accessories can be employed. Examples include a water tank, a utility tool box, a flatbed trailer and other specific use accessories. In the accessory illustrated, a tray 30 is mounted on a frame comprising a pair of bent tubes 32. At their front ends, tubes 32 support an axle 34 (FIG. 4) to which a pair of wheels 36 are joined on opposite sides of the accessory. For convenience of illustration, one of the wheels 36 has been omitted from FIG. 4. A support bar 38 is mounted between tubes 32 adjacent axle 34. Bar 38 provides structural strength to the accessory frame and provides a base for pivotally connecting the forward portion of tray 30 to the accessory frame by conventional means. At the rear ends of the frame tubes 32, a plate 40 joins the tubes to provide additional structural support for the accessory frame.

To permit the tray 30 to be supported by the accessory frame when the tray is in position for carrying a load, the tray is formed to include a lower portion 42, having a width less than the spacing between frame tubes 32, and an upper portion 44, having a greater width than the frame tube spacing. As a result, the upper portion of tray 30 rests on the frame tubes 32 when the tray is positioned to receive and carry materials.

In the embodiment illustrated, the pivotal connection between the hand truck 10 and the accessory 12 is achieved by providing an opening in plate 40 through which passes a threaded projection extending upwardly from post 28. The plate 40 thus rests on post 28. The accessory 12 is secured to the hand truck 10 by a threaded knob 46. It will be understood, however, that a variety of other conventional pivotal connections can be used instead of that illustrated.

The embodiment described permits ready interchangeability between the hand truck 10 and a variety of accessories. When an accessory is pivotally connected with the hand truck, actuation of the motor by the operator controls on the handle 24 cause the drive wheels 16 to be driven forwardly or in reverse to propel the hand truck and the attached accessory. By manipulating the handle 24, wheels 16 also can be steered whereby the accessory can be moved in a desired direction.

Figure 5:
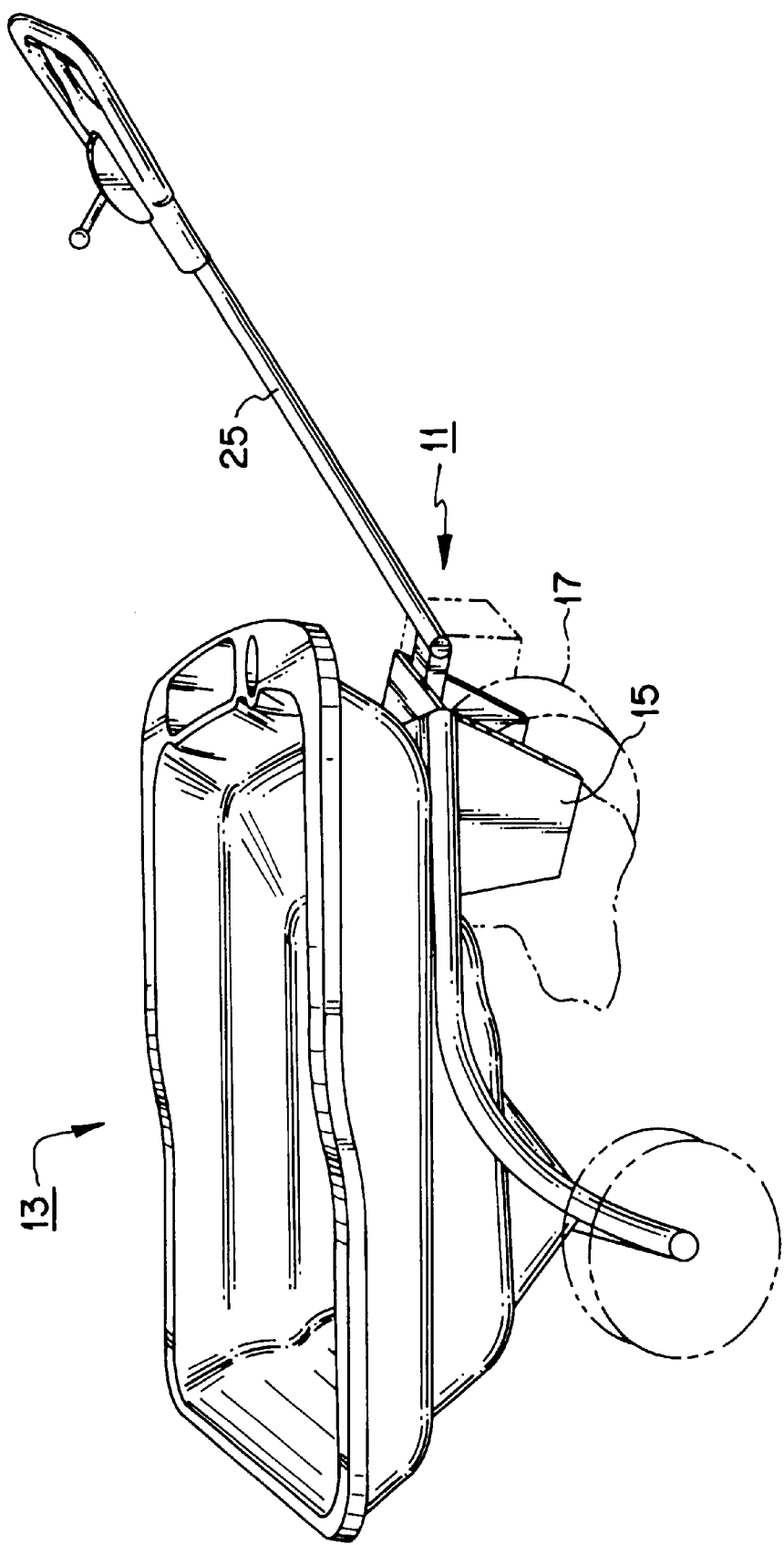
FIG. 5 illustrates a second embodiment of the invention wherein the hand truck is one having a single drive wheel.

In the embodiment of FIGS. 1–4, a pair of drive wheels 16 are utilized. It will be understood, however, that a single wheel motorized hand truck can be employed. Such a device is illustrated in FIG. 5 wherein the hand truck 11 comprises a single drive wheel 17 mounted within an inverted U-shaped frame 15 to which handle 25 is joined in the same manner as described previously with respect to the embodiment of FIGS. 1–4. Electric motor and battery housings are secured, respectively, to opposite sides of frame 15, as indicated in phantom lines. Similar to the embodiment of FIGS. 1–4, wheel 17 is driven by the motor under operator control, and the hand truck 11 and accessory 13 are steered by positioning of the drive wheel in response to handle movement.

While the foregoing embodiments have been described as employing electric motors, it will be appreciated that the hand truck alternatively could be powered by a gasoline engine.

What is claimed is:

1. A motorized hand truck for propelling and steering a wheeled accessory, said hand truck comprising:
   at least one drive wheel rotatably supported by a frame;
   a handle joined to said frame for adjustably positioning the frame and the drive wheel for steering the truck;
   a motor operatively connected to the drive wheel for driving the wheel to propel the truck; and
   a pivot connector mounted on said frame for permitting pivotal attachment of the hand truck to the wheeled accessory.

2. A motorized hand truck according to claim 1, wherein the motor is mounted on said frame.

3. A motorized hand truck according to claim 1, wherein said motor is a reversible electric motor.

4. A motorized hand truck according to claim 3, further comprising a battery connected to the electric motor.

5. A motorized hand truck according to claim 4, wherein the motor and the battery are mounted on said frame.

6. A motorized hand truck according to claim 3, wherein the motor is operated by controls mounted on said handle.

7. A motorized hand truck and wheeled accessory, wherein said hand truck comprises:
   at least one drive wheel rotatably supported by a first frame;
   a handle joined to said frame for adjustably positioning the first frame and the drive wheel for steering the truck;
   a motor operatively connected to the drive wheel for driving the wheel to propel the truck; and
   a pivot connector mounted on said first frame; and wherein said wheeled accessory comprises:
   a second frame pivotally attached to said connector; and
   at least two additional wheels on which said second frame rests, said additional wheels and the pivotal attachment of the second frame to said connector permitting the accessory to be propelled when the drive wheel is driven and to be steered in response to steering of the truck.

8. A motorized hand truck and wheeled accessory according to claim 7, wherein the motor is mounted on said first frame.

9. A motorized hand truck and wheeled accessory according to claim 7, wherein said motor is a reversible electric motor.

10. A motorized hand truck and wheeled accessory according to claim 9, further comprising a battery connected to the electric motor.

11. A motorized hand truck and wheeled accessory according to claim 10, wherein the motor and battery are mounted on said first frame.

12. A motorized hand truck and wheeled accessory according to claim 9, wherein the motor is operated by controls mounted on said handle.

13. A motorized hand truck and wheeled accessory according to claim 7, wherein the second frame is removably attached to the connector.

14. A motorized hand truck and wheeled accessory according to claim 7, wherein said wheeled accessory further comprises:
    a tray pivotally joined to said second frame.

15. A motorized hand truck and wheeled accessory according to claim 14, wherein said tray is pivotally joined to the second frame at location at an opposite end of the second frame from an end of the second frame that is pivotally attached to said connector.

16. A motorized hand truck and wheeled accessory according to claim 15, wherein the second frame is removably attached to the connector.

17. A motorized hand truck and wheeled accessory according to claim 16, wherein said connector comprises a post projecting upwardly from said first frame and wherein said second frame comprises a pair of spaced tubes joined by a support plate which is pivotally secured to the post.

18. A motorized hand truck and wheeled accessory according to claim 17, wherein said tray is formed to rest on said tubes when said tray is located in a first position from which first position the tray is pivotally movable to a second position.

* * * * *